2,213,213

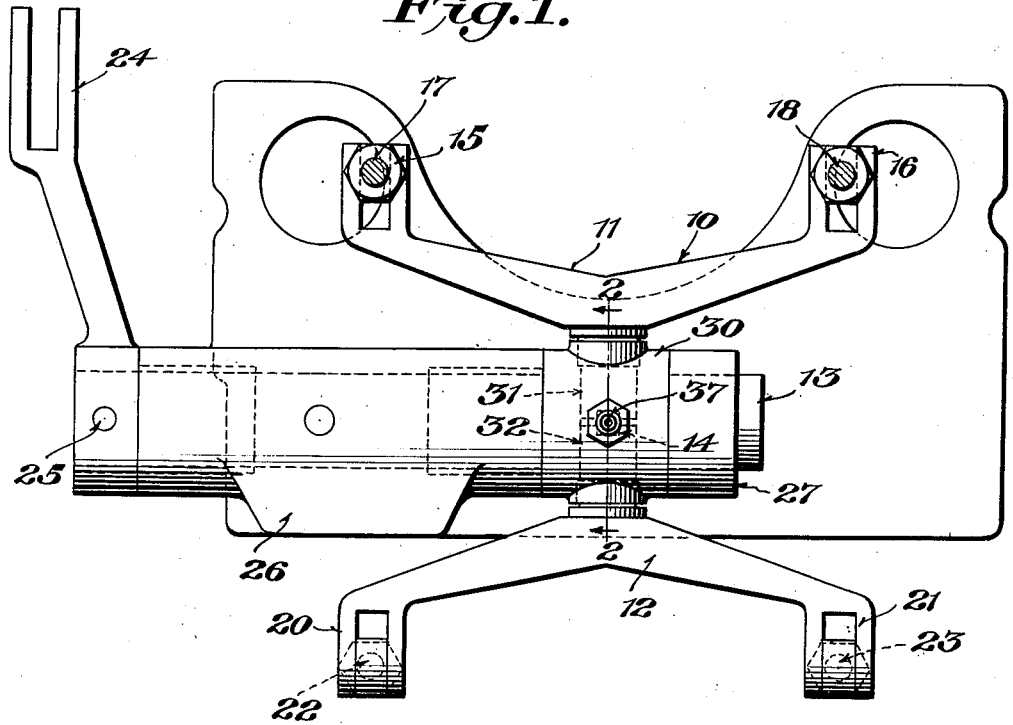
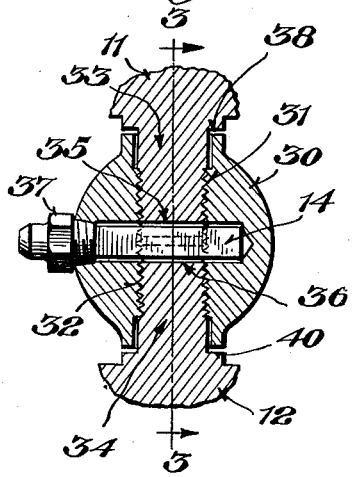
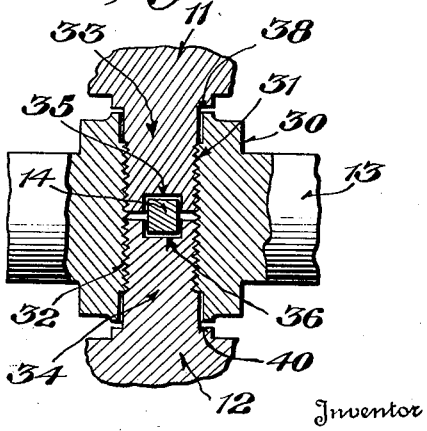
Sept. 3, 1940. J. G. HAWLEY 2,213,213
EQUALIZING MECHANISM
Filed June 1, 1938
Fig.1.
Fig.2.
Fig.3.
Inventor
Jesse G. Hawley,
By
Attorney Patented Sept. 3, 1940

UNITED STATES PATENT OFFICE 2,213,213

EQUALIZING MECHANISM

Jesse G. Hawley, Painted Post, N. Y., assignor to Hawley-Jones Corporation, Riverside, N. Y., a corporation of New York Application June 1, 1938, Serial No. 211,298

7 Claims. (Cl. 188—204)

This invention relates to the art of brakes and more particularly to an equalizing mechanism therefor.

In prior brake constructions, there has been considerable difficulty in equalizing the pressure on all four brakes, and in maintaining the remaining brakes in operating condition, if something goes wrong with one or more of the other brakes. I have found that both of these objections can be overcome by the simple mechanism illustrated and described herein.

It is, therefore, an object of my present invention to provide a new and improved equalizing mechanism.

It is another object to provide means to prevent the non-application of the brakes if something happens to one brake or cable.

It is a further object to provide a safety factor which allows the brakes to be applied in case something goes wrong with one or more of the other brakes.

With the above and other objects in view which will be apparent as the description proceeds, I have set forth my invention in the following specification and have illustrated it in the accompanying drawing in which:

Figure 1 is a vertical elevation of my improved equalizing mechanism and related parts;

Fig. 2 is a vertical section on the line 2—2 of Fig. 1; and

Fig. 3 is a vertical section on the line 3—3 of Fig. 2.

Referring to the accompanying drawing, and particularly to Fig. 1 thereof, I have disclosed my improved brake equalizing mechanism 10, including a pair of double arms 11 and 12, a cross shaft 13 and a locking pin 14.

Arm 11 terminates in yokes 15 and 16 to which are secured the cables or links 17 and 18, respectively, for transmitting the movements of the arm 11 to the left rear and right rear brakes, respectively.

Arm 12 terminates in similar yokes 20 and 21 to which are likewise secured the cables or links 22 and 23, respectively, for transmitting the movements of the arm 12 to the left front and right front brakes, respectively.

The brake applying and brake releasing impulses are conveyed to the arms 11 and 12 through an arm 24 that is pinned at 25 to the cross shaft 13, which in turn transmits the impulse to the arms 11 and 12.

Cross shaft 13 is mounted in any suitable bearings 26 and 27 which are herein shown as being carried by a plate 28.

Cross shaft 13 is provided with an enlargement 30 between the bearings 26 and 27. This enlargement 30 is threaded internally at 31 and 32 to receive correspondingly threaded portions 33 and 34 on the arms 11 and 12. Threaded portions 33 and 34 are each provided with square slots 35 and 36 at their extreme ends to receive a locking pin 14. The latter is inserted in place through the opening provided for an Alemite fitting 37 after the arms 11 and 12 have been threaded into engagement with the cross shaft 13 at 31 and 32, respectively.

When the parts are assembled, arms 11 and 12 are screwed into the cross shaft 13 so as to leave about $\frac{1}{32}''$ between the cross shaft and corresponding shoulders 38 and 40 on arms 11 and 12, to allow the arms to have a limited freedom of movement upon the threaded portions 33 and 34. The latter is limited, however, by the relative size of locking pin 14 and the square slots 35 and 36.

In practice, it has been found that if the arms 11 and 12 are given sufficient clearance to permit outer ends to move about $\frac{1}{4}''$ closer to or farther from a vertical plane passing through the axis of the cross shaft 13, by the turning of the threaded portions 33 and 34, respectively, in their threaded sockets 31 and 32, that will provide sufficient equalization to keep the brakes in perfect adjustment. Furthermore, if one of the brakes or cables should break for any reason whatsoever, the action of the other brakes would not be interfered with, since this movement is limited to a predetermined amount, such as $\frac{1}{4}''$.

It should be noted that the pin 14, which is square in cross-section, is not intended to limit the equalizing action, but merely to act as a safety factor in case something happens to one of the cables or brakes.

The threaded sections 33 and 34 on arms 11 and 12, respectively, enable them to always maintain their proper relation with respect to the center line of the cross shaft 13.

Furthermore, the threaded surface gives twice as much bearing surface as would be obtained were these surfaces smooth.

Grease is forced into the Alemite fitting 37 to lubricate the bearings on the threaded portions 33 and 34.

Although the parts may be made in any desired way, I prefer to utilize forgings for the arms 11 and 12 and cross shaft 13.

It will, therefore, be apparent that I have developed a simple and mechanically correct means of equalizing four brakes and providing a safety factor in case anything happens to one of the cables or brakes.

As many apparently widely different embodiments of this invention may be made without departing from the spirit thereof, it is understood that I do not limit myself to the foregoing embodiments or description except as indicated in the following claims.

I claim:

1. In a brake equalizing mechanism, the combination of a cross shaft which receives the brake actuating impulse, a pair of actuating arms for transmitting the brake actuating impulse to the brake connections, and means passing through the actuating arms for preventing more than a predetermined relative movement between the actuating arms and the cross shaft.

2. In a brake equalizing mechanism, a combination of a cross shaft which receives the brake actuating impulse, a pair of actuating arms for transmitting the brake actuating impulse to the brake connections, and means passing through the actuating arms for insuring the application of the remaining brakes if some but not all of the brake connections should fail to function.

3. In a brake equalizing mechanism, the combination of a cross shaft which receives the brake actuating impulse, a pair of actuating arms threaded into engagement with the cross shaft for transmitting the brake actuating impulse to the brake connecting means, recesses in the ends of such threaded portions, and a locking pin inserted in said recesses.

4. The brake equalizing mechanism of claim 3, in which the locking pin is at right angles to the threaded portions of the arms.

5. The brake equalizing mechanism of claim 3, in which the locking pin is of rectangular cross-section.

6. The brake equalizing mechanism of claim 3, in which the locking pin is square in cross-section and has a clearance of not over one-thirty-second inch from the sides of the recesses.

7. The brake equalizing mechanism of claim 3, in which the locking pin is inserted through the opening provided for an Alemite fitting before the latter is inserted, said Alemite fitting also lubricating the threaded portions.

JESSE G. HAWLEY.